C. H. BOWIN.
Harness for Breaking Horses.

No. 196,132. Patented Oct. 16, 1877.

WITNESSES:
H. W. Almqvist
J. H. Scarborough

INVENTOR:
C. H. Bowin
BY Munn & Co
ATTORNEYS.

UNITED STATES PATENT OFFICE.

CHARLES H. BOWIN, OF ROCHEPORT, MISSOURI.

IMPROVEMENT IN HARNESS FOR BREAKING HORSES.

Specification forming part of Letters Patent No. 196,132, dated October 16, 1877; application filed August 11, 1877.

*To all whom it may concern:*

Figure 1:
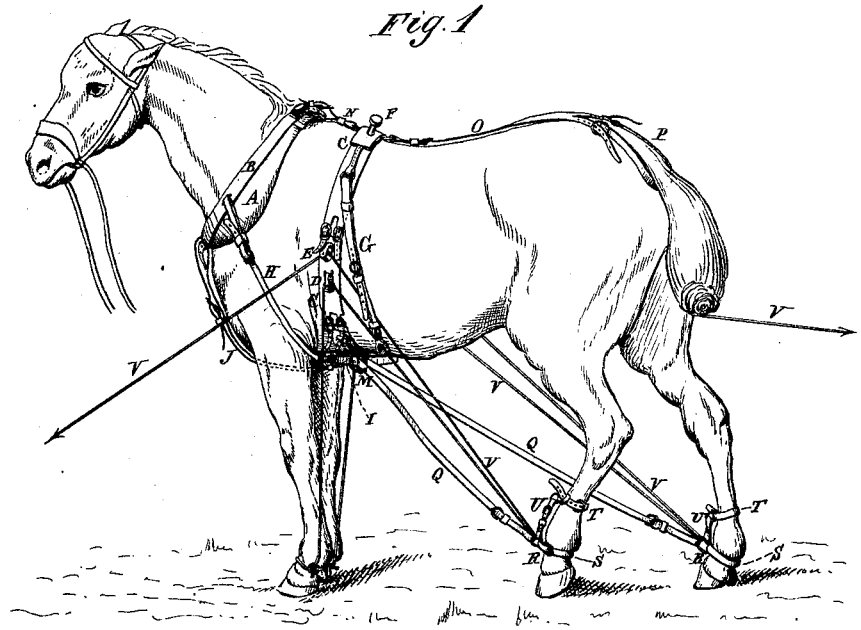
Figure 2:
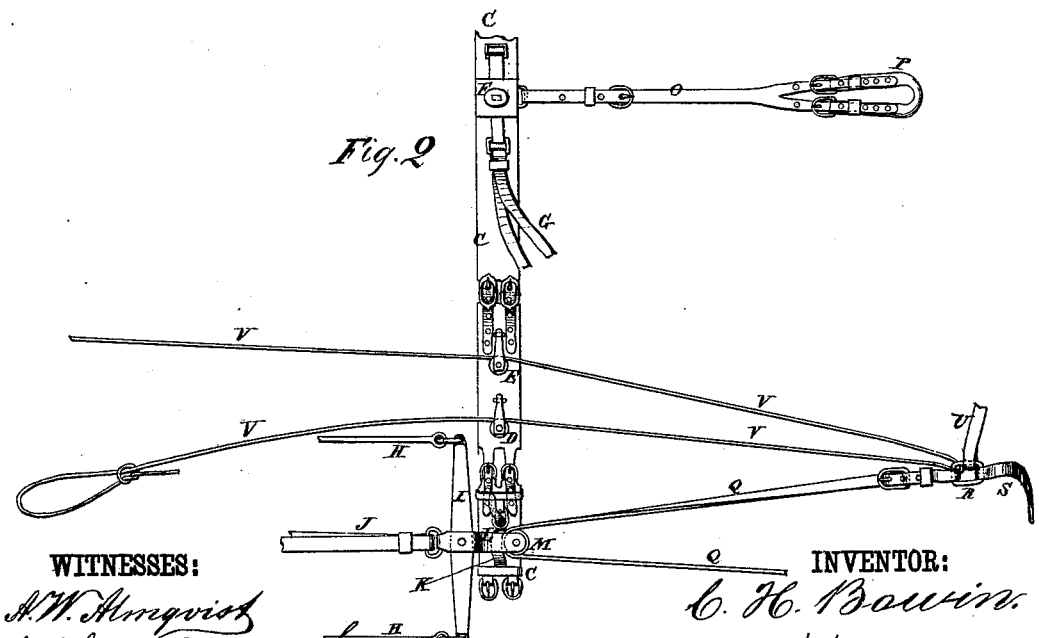

Be it known that I, CHARLES HARRISON BOWIN, of Rocheport, in the county of Boone and State of Missouri, have invented a new and useful Improvement in Harness for Breaking Horses, of which the following is a specification:

Figure 1 represents my improved harness applied to a horse. Fig. 2 is a detail view of a part of the harness.

Similar letters of reference indicate corresponding parts.

The object of this invention is to furnish an improved harness for use in breaking and training wild and unbroken and improperly broken horses, which shall be so constructed as to enable the horse to be completely controlled without being injured or allowed to injure the operator.

The invention consists in the combination of the collar and harness, the adjustable girth, provided with the handle, the stirrup-straps, the pulleys, and the short cross-bar strap, the hame-tugs, the cross-bar, provided with the roller, the lower and upper connecting-straps, the crupper-strap, and the sliding strap, having three short straps connected with each end; and in the combination of the two ropes with the pulleys attached to the girth, and with the sliding strap and its attached short straps, as hereinafter fully described.

A B are the collar and hames, which are made in the usual way.

C is a wide and strong girth, which is buckled around the horse's body in the rear of his fore legs. I prefer to make the girth C in four parts, connected together by buckles to enable it to be adjusted to large and small animals without changing the proper relative position of its attachments. To the girth C, upon each side of the animal, are attached two pulleys, D E. To the center of the top part of the girth C is attached a strap or handle, F, for the rider to take hold of, as required. To the opposite sides of the upper part of the girth C are attached the stirrup-straps G.

H are the hame-tugs, the forward ends of which are attached to the hames B, in the usual way. The rear ends of the hame-tugs H are attached to the ends of a short cross-bar, I, placed beneath the animal's body in the rear of his fore legs. To the middle part of the cross-bar I is attached the rear end of a strap, J, the forward end of which is buckled around the lower part of the collar and hames A B. The straps H J are provided with buckles so that they can be lengthened and shortened, as required.

The middle part of the cross-bar I is connected with the lower part of the girth C by a short strap, K, that passes through the keeper L, to which the roller M is pivoted, and which is attached to said cross-bar I. The upper part of the girth C is connected with the upper part of the collar and hames A B by a strap, N. To the upper part of the girth C is attached a strap, O, which extends along the animal's back, and to its rear end is attached the crupper P. The straps N O are provided with buckles, so that they can be lengthened and shortened, according as they are to be used upon a larger or a smaller animal.

Q is a strap the middle part of which passes around the roller M attached to the cross-bar I. The ends of the strap Q are attached to metal loops R, to which are also attached short straps S, to be buckled around the fetlocks, or below the hough-joints of the animal's hind-legs.

T are short straps to be buckled around the animal's hind legs, above the fetlock-joints or the hough-joints, and which are connected with the metal loops R by the short straps U. The strap Q is provided with buckles to enable it to be lengthened and shortened, as required.

V are two cords, the ends of which are attached to the fetlocks of the animal's fore legs, and which pass thence around the lower pulleys D, through the metal-loops R, around the upper pulleys E, and their other ends are left free to be handled by the operator or his assistants.

In using my improved harness, the girth C is first buckled around the animal's body. One of the ropes V is then passed around the lower pulley D, is passed forward between the horse's fore legs, is tied in a slip-knot around the fore leg, and is pushed down below the fetlock-joint with a stick.

The other end of the rope V is then passed between the animal's hind legs, around one leg above the hough-joint, around the upper pulley D, and is drawn so tight that it will not drop down to prevent the animal from stepping out of it. The other rope V is then applied at the other side of the horse in the same way. A man then takes hold of each rope, each man drops the loop of his rope down to the horse's hind feet, and then draws the loose end of his rope outward or from the horse. As the ropes V are drawn taut the horse will try to start, and as his fore feet pull up the easier, they will be drawn up, and the horse will drop to his knees. This takes his weight off the hind feet, and they will be drawn up, the horse dropping to his belly. The off rope is then drawn upward, which turns the horse upon his near side, and two loops are taken with the off rope around the off hind foot. The near rope is now beneath the horse, with its free end extending out at his back. The free end of the near rope is brought over the horse's back and looped to his off hind foot. The horse is now tied, so that he can neither get up nor hurt the operator; and he is handled, rubbed, and patted all over, to show him that he will not be hurt, and thus make him gentle.

The collar and hames are now put on, the cross-bar I is placed back of the horse's fore legs, and the off hame-tug H is buckled to the hames. The off strap S is buckled around the off hind leg below the hough-joint, and the strap T above the hough-joint, to prevent the strap S from slipping down.

The strap J is passed between the horse's fore legs, and is buckled to the hames and collar A B and to the cross-bar I. The cross-bar I is next secured to the girth C by the strap K, which brings the cross-bar I directly beneath the girth C, and prevents it from rubbing the horse. The horse is now rolled over upon his off side, the near hame-tug H is buckled to the hames B, and the near straps S T are buckled around the near hind leg. The ropes V are now taken from the hind feet, and the horse allowed to get up, which he can do with the ropes V still fastened to his fore feet. The stirrup-straps G are then buckled to the girth C, the crupper P is secured in place, and the strap N is buckled to the girth and upper hame-strap.

In the case of mules, the crupper is put on as soon as they are thrown, as their shoulders are low, and allow the girth C to slip too far forward.

The horse is then led about, handled, and ridden, the rider moving about all over the horse's back.

In case the horse will not stand to be mounted, the ropes V are again attached, and their free ends are led back in the rear of the horse, and held by an assistant, who, when signaled to do so, pulls the ropes and throws the horse to his belly.

The harness may also be used for breaking balky horses, by taking the free ends of the ropes into the wagon to be used to throw the horse, as occasion may require.

This harness prevents the horse from running, rearing, kicking, &c., and enables him to be easily controlled.

Having thus described my invention, I claim as new and desire to secure by Letters Patent—

1. The combination of the collar and hames A B, the adjustable girth C, provided with the handle F, the stirrup-straps G, the pulleys D E, and the strap K, the hame-tugs H, the cross-bar I, provided with the roller L M, the two connecting-straps J N, the crupper-strap O P, and the sliding strap Q, having the short straps S T U connected with each end, substantially as herein shown and described.

2. The combination of the ropes V with the pulleys D E attached to the girth C, and with the sliding strap Q, and its short straps S T U, substantially as herein shown and described.

CHARLES HARRISON BOWIN.

Witnesses:
W. S. WOODS,
WM. WILHITE.